April 29, 1924.
A. BARR
AUTOMOBILE BRAKE
1,492,154
Filed Feb. 24, 1921
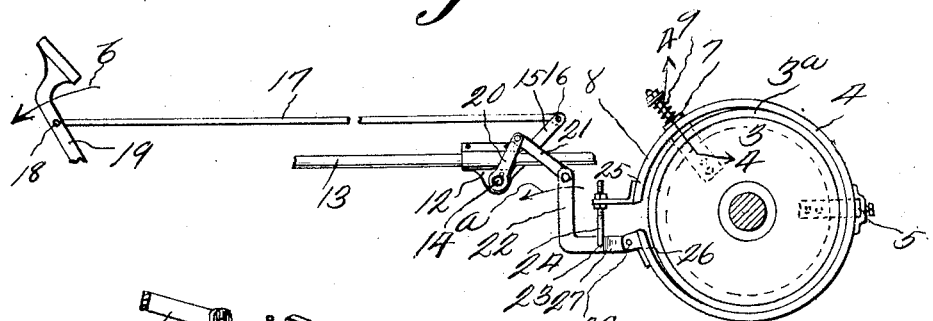
Inventor
A. Barr
By D. Swift
Attorney Patented Apr. 29, 1924.

1,492,154

UNITED STATES PATENT OFFICE.

ALEX BARR, OF CORBETT, OREGON.

AUTOMOBILE BRAKE.

Application filed February 24, 1921. Serial No. 447,448.

*To all whom it may concern:*

Be it known that I, ALEX BARR, a citizen of the United States, residing at Corbett, in the county of Multnomah, State of Oregon, have invented a new and useful Automobile Brake; and I do hereby declare the following to be a full, clear, and exact description of the invention, such as will enable others skilled in the art to which it appertains to make and use the same.

The invention relates to automobile brakes and has for its object to provide a device of this character comprising brake drums and bands carried by the rear wheels of the automobile, said brake bands being operated from a lever located forwardly of the automobile, which levers rock a rockable shaft, rockably mounted in bearings supported by the driving shaft casing and the radius rods adjacent their rear ends, thereby allowing both brake bands to be contracted by the operating lever independently of the fact whether one wheel is on the automobile or two.

A further object is to provide means whereby the conventional form of brake drum may be quickly enlarged in diameter and in width thereby allowing use of a wider brake band and on a greater circumference, thereby increasing the efficiency of the braking operation, said result being obtained by shrinking on the brake drum, a band of greater width than the brake drum and providing a wider brake band.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the rear end of an automobile running gear, showing the brake mechanism applied thereto.

Figure 2 is a vertical sectional view taken on line 2—2 of Figure 1, showing the brake mechanism in side elevation.

Figure 3 is a detail perspective view of the brake band contracting lever.

Figure 4 is a sectional view taken on line 4—4 of Figure 2.

Referring to the drawings, the numeral 1 designates the rear axle of a conventional form of automobile and 2 the rear wheels of an automobile. Each wheel 2 is provided with a brake drum 3 of a conventional construction and which revolve with the wheels. Brake drums as at present constructed are not of sufficient diameter and width to obtain the proper braking action and efficiency and to overcome this difficulty a band $3^a$ is shrunk on the drum 3, said band being wider than the drum thereby increasing the braking surface and at the same time increasing the diameter of the brake drum as a whole thereby providing greater braking and frictional engaging surface for the brake band.

Surrounding each brake drum 3 and its ring $3^a$ are brake bands 4, which brake bands are supported adjacent their rear sides by supporting brackets 5, which brackets are carried by the axle casing 6. Each band is supported by an auxiliary bracket 7 carried by the axle casing 6, and maintains the end 8 of the brake band 4 out of engagement with the periphery of the brake drum 3, there being a spring 9 cooperating with said bracket 7 for accomplishing the above result. Brake band 4 is of substantially the same width as the band $3^a$, thereby increasing its engaging surface. Rockably mounted in a bracket 10, carried by the casing 11 of the drive shaft and in brackets 12 extending downwardly from the radius rods 13 is a transversely disposed rockable shaft 14. Extending upwardly and rearwardly from said shaft 14 at a point substantially centrally thereof is an arm 15, to which arm 15 is pivotally connected as at 16, a forwardly extending connecting rod 17. The forward end of the connecting rod 17 is pivotally connected as at 18 to the foot lever 19.

Secured to the outer ends of the rockable rod 14 are arms 20, said arms having link connections 21 with bell cranks 22. The bell cranks 22 are rockably mounted as at 23 on adjustable members 24 carried by the ends 25 of the brake bands 4 and are adapted to be rocked in the direction of the arrow $a$ which rocking action will cause the ends 26 of the brake bands 4 to be forced upwardly by the bell cranks 22, which have their arms 27 pivotally connected to the ends 26 of the brake bands as at 28. It will be seen that as the foot pedal 19 is moved in the direction of the arrow $b$ that the transversely disposed rod 14 will be rocked in its bearings and that the bell crank levers 22 will also be rocked, thereby contracting the brake bands 4 so that they will cooperate with the peripheries of the brake drums for applying a braking action to both rear wheels of the automobile. It will also be seen that this braking action will take place on both wheels even if one wheel is broken incident to skidding or from other accidental purposes.

The invention having been set forth, what is claimed as new and useful is:—

1. The combination with the rear axle of an automobile having wheels thereon, said wheels having brake mechanism comprising brake drums and brake bands, the adjacent ends of the brake bands being forwardly disposed, of means for simultaneously contracting said brake bands, said means comprising a transversely disposed rockable shaft, located adjacent the front of the bands and above the adjacent ends thereof, upwardly and rearwardly extending arms carried by said rockable shaft at its ends, bell crank levers having one of their arms pivotally connected to the lower ends of the bands, the other arms of the bell crank levers extending upwardly, downwardly and rearwardly extending links pivotally connected to the upwardly and rearwardly extending arms and to the upper end of the upwardly extending arms of the bell crank levers, vertically adjustable members carried by the upper ends of the brake bands and extending downwardly, said vertically adjustable members being pivotally connected to that one of the arms of the bell crank levers which are pivotally connected to the lower ends of the brake bands and at points spaced from the ends of said bell crank lever arms.

2. The combination with a brake drum of an automobile, of a band disposed on the periphery of said brake drum and relatively wide in relation to the brake drum and a contractible brake band extending around the first mentioned band and of substantially the same width as the first mentioned band.

In testimony whereof I have signed my name to this specification in the presence of two subscribing witnesses.

ALEX BARR.

Witnesses:
 M. D. JOYCE,
 G. GISTAKE.